(12) United States Patent
Outwater et al.

(10) Patent No.: US 10,883,843 B2
(45) Date of Patent: Jan. 5, 2021

(54) METHOD FOR REMOTELY IDENTIFYING ONE OF A PASSENGER AND AN ASSIGNED VEHICLE TO THE OTHER

(71) Applicants: Chris Outwater, Santa Barbara, CA (US); William Gibbens Redmann, Glendale, CA (US)

(72) Inventors: Chris Outwater, Santa Barbara, CA (US); William Gibbens Redmann, Glendale, CA (US)

(*) Notice: Subject to any disclaimer, the term of this patent is extended or adjusted under 35 U.S.C. 154(b) by 0 days.

(21) Appl. No.: 16/201,476

(22) Filed: Nov. 27, 2018

(65) Prior Publication Data

US 2019/0234747 A1 Aug. 1, 2019

Related U.S. Application Data

(63) Continuation of application No. 15/254,157, filed on Sep. 1, 2016, now Pat. No. 10,139,237.

(Continued)

(51) Int. Cl.
*B60Q 1/50* (2006.01)
*G01C 21/34* (2006.01)
*G08G 1/123* (2006.01)
*H04W 4/029* (2018.01)
*G08G 1/005* (2006.01)
*G08G 1/00* (2006.01)
*H04W 12/06* (2009.01)
*H04W 4/40* (2018.01)
*H04W 40/20* (2009.01)
(Continued)

(52) U.S. Cl.
CPC ........... *G01C 21/3438* (2013.01); *B60Q 1/50* (2013.01); *G08G 1/005* (2013.01); *G08G 1/123* (2013.01); *G08G 1/202* (2013.01); *G08G 1/205* (2013.01); *H04W 4/029* (2018.02); *H04W 4/40* (2018.02); *H04W 12/0605* (2019.01); *H04W 12/0609* (2019.01); *B60R 1/00* (2013.01); *B60R 25/24* (2013.01); *H04L 2209/84* (2013.01); *H04W 4/02* (2013.01); *H04W 4/021* (2013.01); *H04W 4/023* (2013.01); *H04W 40/20* (2013.01)

(58) Field of Classification Search
CPC ..... H04W 12/06; H04W 40/20; H04W 4/046; H04W 4/023; H04W 4/02; H04W 4/021; B60R 25/24; B60R 1/00; G06Q 50/30; G06Q 20/4012; B60Q 1/50; G08G 1/005; G08G 1/123; G08G 1/202; G08G 1/205
See application file for complete search history.

(56) References Cited

U.S. PATENT DOCUMENTS

2016/0275329 A1* 9/2016 Gussen .............. G06K 7/1447
2016/0335530 A1* 11/2016 Davis ................. G06K 19/0727
(Continued)

*Primary Examiner* — Benyam Haile
(74) *Attorney, Agent, or Firm* — Clifford H. Kraft

(57) ABSTRACT

When a vehicle is assigned to meet with a customer at a meeting location, as when the customer orders a ride and the taxi, ride-sharing operator, or autonomous vehicle is dispatched, the difficulty of identifying the assigned vehicle among many vehicles or the customer among many people, is solved by providing a code, unique to the meeting at the meeting location. A light signal based on the code is emitted by a first device (of the vehicle or the customer) and distinguished, based on the code, by a second device, whereby the location of the first device is determined and can be displayed or otherwise used for navigating to the other.

17 Claims, 1 Drawing Sheet

Related U.S. Application Data

(60) Provisional application No. 62/212,893, filed on Sep. 1, 2015.

(51) Int. Cl.
　　　*B60R 25/24*　　　(2013.01)
　　　*H04W 4/02*　　　(2018.01)
　　　*H04W 4/021*　　　(2018.01)
　　　*B60R 1/00*　　　(2006.01)

(56) References Cited

U.S. PATENT DOCUMENTS

2017/0017920 A1* 1/2017 Stark .................. G07C 9/00896
2017/0039668 A1* 2/2017 Luke ...................... B60L 58/10

* cited by examiner

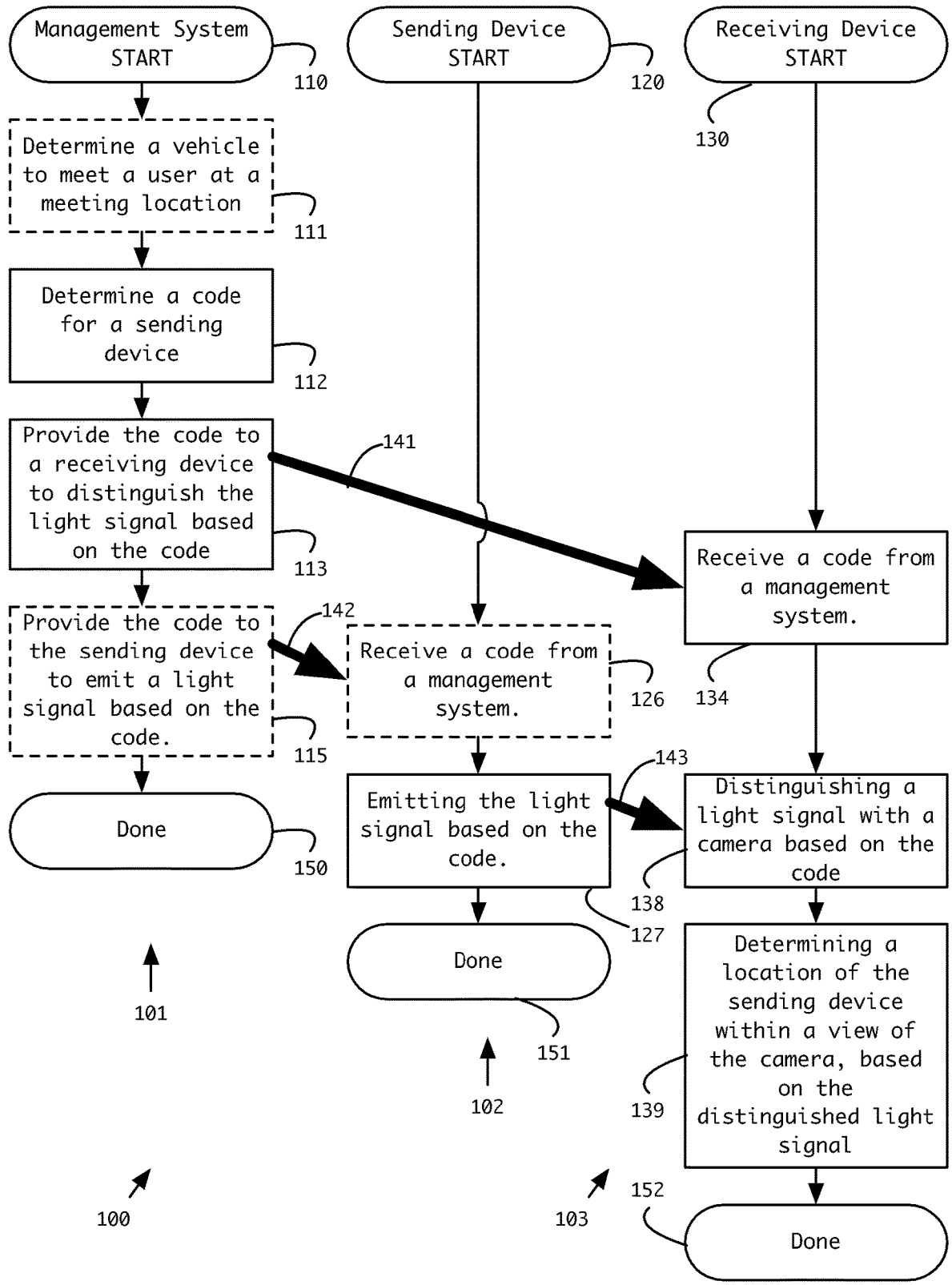

METHOD FOR REMOTELY IDENTIFYING ONE OF A PASSENGER AND AN ASSIGNED VEHICLE TO THE OTHER

This is a continuation of application Ser. No. 15/254,157 filed Sep. 1, 2016. application Ser. No. 15/254,157 is hereby incorporated by reference in its entirety.

BACKGROUND

Field of the Invention

The present invention relates generally to remotely identifying one of a passenger and an assigned vehicle to the other.

Description of the Problem Solved

There is a large need of a way to pick up and deliver humans, animals, plants, and other inanimate objects such as packages. In the prior art, each of these applications is handled in a different way. People are transported by cars, buses, taxis, and the like. Inanimate objects are transported by trucks, trains, and delivery services like UPS and FEDEX.

An autonomous delivery vehicle is described that can transport and deliver both living things, such as humans, animals, plants, etc., and also pickup and deliver inanimate objects such as packages.

SUMMARY OF THE INVENTION

The present invention relates to a method of identification applicable when vehicles are to meet users. The method includes the steps of determining a first code with a management system for a meeting between a vehicle and a user at a meeting location, and indicating the first code with the management system to a first one selected from a first device aboard a vehicle and a second device with a user. The first device and the second device having communication with the management system. A different second one selected from the first device and the second device to emit a first light signal based on the first code while at the meeting location, the first one selected having a first camera to detect the first light signal and distinguish the second one selected within the view of the first camera on the basis of the first code, the first code being unique at the meeting location.

DESCRIPTION OF THE FIGURES

FIG. 1 shows an overall finding and spotting process.
The scope of the present invention is not limited to what is shown in the FIGURE.

DESCRIPTION OF THE PREFERRED EMBODIMENTS

In one embodiment, the present invention comprises a unique vehicle with various sized, secure compartments in place of, or in addition to, human seating compartments. This novel vehicle can serve multiple purposes due to its unique design and secure access methods.

Because the autonomous vehicle has no human driver, it must rely on its own vehicle control system determining location and guidance. The vehicle control system can be used in conjunction with a management system to define where and when and to whom a delivery is made. The recipient can offer a secure code at a specific time and place in order to allow access to a delivery compartment and to confirm delivery. The delivery compartment can be for a package or other inanimate object, or it can be for human or animal transport.

One embodiment is an Autonomous Vehicle (AV) that can have passengers and also carry packages. Packages can be added at a point of trip origin, or at any location along the way. This can be based on dynamic routing of vehicle location, destinations, and passenger lists, or package requests. As with passengers, packages can be added or taken from the AV along the planned course of travel. Unlike a flying drone that is a low-asset value vehicle and because of this low value, can be held and wait a long period of time for its intended package recipient, the AV can have much more value and can be continually offering stops to package senders/adders or package recipients/takers and a specific time window and place to meet. Due to the very accurate reading of time and location of the AV, any disputes about package sending or receiving, such as a missed stop, can be resolved using verified data. Packages can be added by known users who approach an AV either at a predetermined time and location, or in an ad hoc, opportunistic fashion. The screen of the user's smartphone can be scanned by a barcode reader on the vehicle, or there can be an radio frequency (RF) exchange, for example, via Bluetooth™ or Wi-Fi.

The autonomous vehicle can have a plurality of various sized compartments for packages and the like. Each compartment can have an electronic lock under the control of a vehicle control system aboard the vehicle. The vehicle control system can include one or more processors executing computer instructions stored in a memory device. The vehicle control system can also interface with various short-range and long-range communication modules employing technologies such as Bluetooth™, Wi-Fi, cellular telephone, dedicated licensed or unlicensed RF communications and any other communication method or technique. In addition to package compartments, the autonomous vehicle can also include one or more passenger compartments. Doors can be controlled by the vehicle control system so that they only open when a boarding passenger or when a user depositing or retrieving a package is positively identified by a certificate, a data exchange with the vehicle, and/or biometrics. The doors can open from inside to allow passengers to exit without re-identifying them. The vehicle control system may comprise a guidance module, which may comprise its own processor with memory, or rely on other processor(s) of the vehicle control system. The guidance module may use Global Positioning System (GPS) signals, cellular telephone or other RF-based navigation, inertial navigation, magnetic compass, altimeter, accelerometers, gyroscopes, and any other method to sense location, direction and speed. The guidance module can execute navigation and prediction algorithms including Kalman filtering and the like to determine location and speed, and route optimization algorithms to optimize the route between various user/object ingress and egress locations. The preferred short-range communication module technology is Bluetooth™, typically offer the following profiles:

Serial Port Profile (SPP), Dial-up Networking Profile (DUN), and Personal Area Networking Profile (PAN)

These profiles allow an external device to connect to the Internet using a smartphone's data connection. Different vehicles work in different ways, using one or more of these three profiles. For example, Toyota Entune uses SPP to communicate with the Web through a telephone. Ford Sync AppLink also uses SPP to connect with supported Apps, but the Ford Sync Services function actually makes voice calls to its automated call center.

Message Access Profile (MAP)

MAP allows incoming messages (usually text messages addressed to the smartphone via Smart Message Service, or SMS) to be relayed to a vehicle's infotainment system where they can be displayed or read aloud by a text-to-speech module.

Secure Simple Pairing (SSP)

This profile is a pairing mechanism. SPP replaces the PIN input with a six-digit key that is generated at the time of pairing and displayed on both devices. The user simply confirms the match and the pairing is done. This pairing approach is both simpler, because it does not require inputting a PIN (just matching the keys), and safer, because there are more numbers between 0 and 999,999 than just 0 and 1234.

AVs can support many of the above Bluetooth™ profiles plus Wi-Fi. The AV can have multiple compartments along the sides, back and top and, based on the size and weight of the package being added, the person adding the shipment can purchase an appropriately sized compartment. Upon verification, the purchased compartment can open. Compartments can have secure weight and dimensional measurement sensors in them, such as a scale for weight and camera or ultrasound sensors for exact size; however, in the early stages, weight alone is sufficient because the maximum size of the compartment is known. Size and weight along with the package delivery distance can allow for reasonable billing. In the same way that there are common shipping box sizes, there can be common compartment sizes on the AV. In addition, there can be common luggage sizes such as carryon luggage similar to sizes used by the airlines. In highly dense population areas where an AV can be shared for the highest efficiency, passengers and packaged goods may travel together towards common or consecutive destinations. A user can be able to spot the best available AV using the technique described later in this description.

If an AV is to carry both passengers and packages, this can be known to the passengers who may receive a reduced or discounted fare, due to multiple stops or side trips associated with receiving or delivering packages. In other cases, an AV may carry "passengers only", or operate as an "express only", and not take packages. There can also be AVs to pick up passengers at airports, train stations, and the like, to relay passengers and their luggage to nearby facilities, such as car rental locations and nearby hotels. Such vehicles would be expected to remain within a confined area near the airport or train station. All such AVs should expect standard size carry-on luggage dominant across the airlines today, but customers with a greater quantity of luggage, or larger sizes, of luggage might be directed to particular AVs better able to accommodate them.

The process for receiving a package from an AV can be similar to adding a package, but in reverse. A management system can inform both the AV and the intended recipient of the calculated time and place for delivery, e.g., the southwest corner at the intersection of 8th Avenue and 23rd Street between 8:22 and 8:25 AM. The recipient typically plans to arrive at that time and can spot the AV. The process for finding and spotting a specific AV at a predetermined time and place is described later in this description and can include Visual Light Communications (VLC). The recipient can approach the AV that carries his or her package. When within the local RF distance, a secure digital certificate transfer can take place, and the recipient can also show a barcode on his or her telephone or tablet to a barcode reader on the exterior of the AV. At this point in the process, if there is a valid digital certification represented by the smartphone and the barcode which contain the same secure and time-stamped data confirming the ID of the recipient and the intended package delivery, then the compartment containing the package can open, and additionally an indicator light at or near the compartment can flash until the package is taken, and the compartment door closes. The AV can then proceed to its next destination.

In another embodiment, the barcode is shown on a screen, such as an LCD screen, on the compartment. The user uses the camera on his or her smartphone to scan the barcode. The smartphone shows the user their compartment. As the user approaches and scans the barcode with the smartphone to authenticate presence at the door, the door opens.

In the present invention, senders and recipients can be humans, robots, or other autonomous vehicles. An important feature of the invention is that a specific compartment or compartments can open at the appropriate location and at the appropriate time in conjunction with a delivery code sent to or shown to the autonomous vehicle's RF or VLC light sensor from the recipient's phone or recipient's agent's phone: Access can be gained only by a person or robot presenting the appropriate release code at that time and at that place.

As AVs become more prevalent, there can be instances in which a potential customer can be looking for their AV amongst a large group of other customers and their summoned or assigned AVs.

The most efficient use of AVs may arise through the use of complex, yet well known, asset routing algorithms. Programs like these are already used by companies such as Route Monkey, and to some degree Uber and ride sharing companies, such as Lyft that want to run the most efficient routes for their vehicles. In the present invention, such asset routing algorithms are executed by the servers of the management system.

The management system can monitor very fluid conditions in which large numbers of vehicles, all at various levels of energy storage, whether electrical or other fuel, can be available in a certain region, to handle a number of potential customers and their respective destinations. In some embodiments, this may include package pick-up and delivery. The quality of the asset routing algorithms becomes particularly valuable when and where they are most needed: At times and in locations, having high-density use, for example when an audience is filing out of a show, or passengers are streaming out of an airport arrival area.

An AV may be pre-assigned by the management system to a particular customer based on a number of factors including energy, range, and maintenance status among a plurality of AVs; the number of customers at a location, their respective destinations; and packages loaded there or elsewhere, each having their own corresponding destinations. Vehicle assignment can be further complicated by customer status, similar to "frequent flier" members who accrue large numbers of miles, and therefore can demand certain loyalty discounts, express trips, or demand priority staging of a shared vehicle and priority seating within a vehicle.

At high-density customer and AV meeting locations such as restaurants, shows, sports arenas, airports, train stations, and the like, a method is needed to identify the specific, assigned AV to its customer(s), so that the most efficient use of assets and energy can be realized.

One object of the present invention is to provide a method for enabling a customer or groups of customers to spot and find their AV during this crucial transition from potential, or intended customer, to authenticated occupant. The overall efficiency achievable by a management system can depend heavily on this transition stage.

There can be situations where a customer needs merely to jump into a waiting AV on a purely ad hoc basis. However, the customer may be known to the management system. The management system may have a profile associated with the customer, including the customer's home and office locations, and customer locations anticipated from travel or commute plans, e.g., airports, train stations, etc. Additionally, the customer can simply indicate a destination with a mobile device that may already know the current location of the customer. When this indication of destination takes place in advance, the known customer (or group of customers to share an AV) can be required to find and enter an assigned AV at a meeting location.

AVs can have various wireless, RF devices onboard. The AVs can not only be communicating with each other in ways similar to local area networks and vehicle to vehicle (V2V), but can also be able to broadcast a specific ID code or number that uniquely identifies that AV. In addition to GPS, there may be RF-based stations, like beacons, that can confirm and micro-locate AVs as they travel along highways and streets, but especially as they enter a transportation hub where occupants are dropped off and picked up.

The management system needs to know who its customers are and where the customers are going. The customers can be offered a choice of vehicles based on destination, price, comfort, and convenience.

The customer can attain a digital certificate based on some transactional or debit or credit account. Certificates can be transmitted from the customer's phone, or other mobile device, to the RF module on the AV. In some embodiments, this transmission is based on Bluetooth™ or Near-Field Communication (NFC) technology.

On the customer's side, a smartphone (or other device) can use GPS to ascertain their location, or use beacons (including Wi-Fi) for more accurate location determination. In conjunction with the management system, it can also find AVs, and even other customers with whom to share an AV having the best route, ultimately finding the best AV match possible to reach the customer's final destination.

No matter what wireless modes are used for acquiring the proper ID of customers and for notifying the customer of the proximity of their assigned AV, a visual cue can also be needed to identify AVs, especially if there are a plurality of AVs that might be available at a given time, or if an AV has been reserved for a customer in advance of arrival.

At the point in time when a customer approaches a meeting location in order to meet the assigned AV, the customer is authenticated as an occupant and added to the AV roster. This is especially important when there are many customers meeting many AVs at a common meeting location (e.g., transportation hub of any sort). An object of the present invention is to limit the period of ambiguity after a number of choices have been made by the customer or his proxy. These choices might include: the correct AV (e.g., the one they own, or the one containing their belongings), the assigned AV, the reserved AV, the least expensive AV, the fastest AV, most luxurious AV, or likely, a best available AV as determined by the management system, based on the customer's profile or where an AV is presently located and how it is being directed towards the customer's location.

The RF modality can be complemented with a "human readable" apparatus placed high on the AV, typically the roof. This apparatus can be as simple as a sign with the unique number of the AV shown in an easy to read display, similar to that already in use with limos and taxis; that is, a unique ID number on the vehicle.

The apparatus can also include a bright daylight-readable digital display that has an ID number and perhaps the name of the assigned customer, or initials of the customer to protect privacy. For situations where AVs are in the loading mode should immediately appear to be different than those that are already occupied, assigned, or reserved, AND, if they are assigned or reserved, the corresponding customer should quickly and easily be able to identify the assigned or reserved vehicle with as little ambiguity as possible.

A simple, economical method to indicate the present location of AV to an intended customer is through augmented reality (AR) or computer-mediated reality technology. Using this method, customers can be able to quickly locate their AV while using their smartphone's viewing screen, or by using AR glasses, such as Google Glass™ or Microsoft Windows HoloLens™

A staging, searching, discovery/spotting, and confirming process must take place as quickly and safely as possible as humans connect with and occupy their assigned AVs. In this part of the transition, the customer goes from being a potential to actual occupant: From being a pedestrian to being a vehicle occupant. During this transition, to take place at the meeting location, both the human and AV need to find each other as efficiently as possible.

Because there might be a designated, dedicated meeting location at a transportation hub for AVs, a large number of similar looking AVs may be packed together there. In addition, AVs may mix with non-AVs at this meeting location. Therefore, although RF signals of all sorts can be useful for identifying AVs (and manned vehicles), there needs to be a visual overlap period, even if transitory, that helps the customer quickly and easily locate the "best choice" or "best choices" among a plurality of AVs.

This process can be accomplished in various ways. One embodiment is to distinguish the target AV using a specific "coded signature" for that AV and providing a □unique "signature decoder" corresponding to that signature. This signature can be in the form of a modulated light, which may be visible, or a display on the roof of the AV. The specific code used to modulate the light is unique at the meeting location, at least over the interval of finding and spotting.

In such an embodiment, the target customer may have a smartphone (or AR glasses) running an application, displaying all of the AVs in view of the smartphone (or AR glasses) camera; however, the target AV would be indicated distinctly to the customer as the target AV, and may further indicate all of the attributes and features that the customer may have chosen, or that were automatically chosen for the customer by the management system based on his profile. This distinct indication of the target AV (or target non-AV vehicle), can be that the AV is brighter in the viewer compared to the other cars, or is outlined, or is pulsing, or has an X over it, or an arrow pointing at it, etc. If this is a ride-share AV, then other target customers assigned to share this AV could likewise see a similar indication on their respective smartphones (or AR glasses).

The AV can know, via communication with the management system, where the customer is. The AV can head towards the fastest and safest meeting location as it negotiates pathways, perhaps around and through crowds of other AVs and non-AV vehicles. The management system might direct that the customer(s) move towards a specific meeting location (e.g., via text, voice prompt, or map), particularly if the management system is herding potential ride share customers to a common pick-up area, and particularly if customers are expected to share a vehicle with a common departure, in which case, all of the potential customers would be running the same "decoder" on their mobile device, such as a smartphone, and would see, from each customer's point of view, the target AV highlighted on their smartphone's screen.

In another embodiment, the customer would be running a smartphone application connected via a wireless network (e.g., the cellular network) to a management system acting as the master database and controller for the entire group of customers and AVs within a defined region. Such a management system could reside in the computing cloud, and may communicate with other management systems, much as Uber, Lyft, and other managed ride and ride sharing companies could share data and schedules for efficiency purposes today, if they chose to do so, or were encouraged to do so by government agencies. Of course, such decisions are dictated by business and public policy.

Alternatively, multiple management systems may operate independently over the same or overlapping regions, though with somewhat diminished efficiency.

The smartphone (or AR glasses) for the AV spotting application should have a screen, a camera, GPS, short range RF like Bluetooth™, and a digital compass. The application can wait for the management system to decide which AV is assigned as the target AV for a given customer, or group of customers, who have requested or reserved a ride to a given destination or destinations.

The present location of the target AV has to be precise, accurate, and current, as the intent of this method is to make a target AV easily spotted by a customer. The current location of the AV can be established by GPS, or by location methods using cellular telephone tower signal strengths; however, a higher precision location may be required, which may be provided with detection of stationary RF beacons or Wi-Fi access points, which may be placed strategically at dense transportation sites, and/or by groups of AVs (and manned vehicles) reporting on each others' location based on vehicle awareness sensors prevalent in the AV for V2V and V2 Infrastructure. Another focus of the invention is the signature and smartphone (or AR glasses) application-based filter that allows only the customer to distinguish their target vehicle on the basis of that signature, quickly and easily, even if among many other vehicles.

One useful technology for this purpose is visual light communication (VLC) and augmented reality. Although this invention is not limited to using visible light only, because infra-red (IR) and other light near-visible wavelengths can be used, the preferred embodiment includes VLC because the phone can have a visible light lens and camera and because VLC is already understood in the industry for creating unique signature signals that can be located by looking through a smartphone camera. Several companies are using VLC for in-store location-based marketing and this has great value. One example of VLC and location-based marketing is ByteLight™ Services marketed by Acuity Brands Lighting, Inc. of Atlanta. The ByteLight technology enables a user to quickly and easily identify stationary products within a retail store. Although the present target vehicle or customer spotting method utilizes some similar underlying technology as VLC location-based marketing, that technology is configured in a different and unique manner to render it suitable for finding mobile assets such as AVs or shared-ride vehicles.

The visible light mode of this spotting process is valuable due to speed of signal access and recognition. Of course, there can be wireless communications with the vehicle for searching and ultimate authentication purposes. However, during an intense "search and find" period involving many customers searching for many vehicles at the same meeting location, the visual mode such as VLC and augmented reality will be superior.

For target vehicle spotting, the preferred embodiment employs VLC; however, not only is the target vehicle mobile, so is the customer. In this invention, VLC technology is adapted to the spotting AVs or any ride-share vehicles.

Presently, a ride-share driver, (e.g., driver for Uber or Lyft), could use an app to blink a smartphone's camera flash LED as a simple, rudimentary signal to differentiate himself and his vehicle from other vehicles when approaching a pick-up location. Of course, were this simple "phone flashlight", whether just on or blinking to become prevalent as a signal, it would also become useless. Therefore, a more complex coded visible signals, such as VLC is valuable for spotting a vehicle.

The advantage of the kind of "light beacon" signal with a unique signature is that it requires only a single source and detector, both at the "encoder" emitter and at the "decoder" receiver.

The vehicle driver, if any, or target customers(s), can supply the emitter or receiver using an app running on existing technology, using components common to smartphones: processor(s), lenses, camera, screen, and the camera's flash LED.

The AV's signal can be a point—source, e.g. a single or few LEDs, within a larger image.

If thought about in terms of photography, consider a series of three basic steps: a wide angle view, medium view and close up, as examples of how a customer would use his phone and VLC to spot his target AV. It is the longer distance, AV spotting at a wide angle using a modulated light source that is the first step in the favored embodiment.

Other likely implementations include modulation of an image backlight (where the image may comprise advertising); or a flickering, modulated pixel in a roof light, headlamp, tail lamp, or all of the above on the AV. In the preferred embodiment the customer can hold up his smartphone with the camera engaged and look at the phone's screen and see a plurality of vehicles on said screen, but only one, the best choice, is the brightest, or outlined, pulsing, or otherwise differentiated in a graphic manner. Perhaps a few AVs are available with the proper destination and profile and they can be highlighted.

Perhaps the less the profile matches, the less bright the AV in the image appears. If the customer misses one vehicle (e.g., it becomes otherwise assigned or departs), another in the vicinity rises in rank to the most favored status, become brightest. The customer then can wait at a particular location, waiting for the vehicle to come to him, or move towards the AVs based on VLC spotting. Then, the customer can connect with the AV's RF signal and transfer a digital certificate via an RF protocol.

The customer can be welcomed into the AV with a friendly beep similar to a barcode reader accepting a valid read. If the customer is alone, or if this is the customer's own vehicle, the AV might welcome the customer by name. The customer can be seated in the vehicle for some time, which gives opportunities for passive facial recognition matches to a known customer based on correlation to the digital certificate used to access the vehicle. In other words, there can be a continuing biometric, such as facial recognition, to determine or update the AV's Occupancy.

By itself, RF communication alone would often be ambiguous and inefficient for determining which AV a customer should enter, because it would only offer the customer the general direction of the signal, if at all. A dot or a bunch of dots on a screen in a general direction is not sufficient. That is why the invention provides a visible (or near visible) light-based location detection and proposes this before proceeding with RF-based authentication.

In another embodiment, during the AV spotting interval, the AV utilizes a wide-angle camera perhaps also mounted atop the vehicle. It is even possible that the following process can be integrated into cameras or sensors already used as part of on-board AV navigation and safety systems. Here, the intended customer, upon spotting his AV by scanning for the VLC signal and enhanced image on his smartphone's screen, can immediately send a unique pulse of modulated light from the flash on his camera phone towards the target AV. The flash on the phone's camera will be pointing in the general direction of the AV, because the intended customer was just viewing the real world through the camera on his smartphone and spotted the AV. In this way, a confirmation can be sent to the target AV that the intended customers(s) are present, as planned, and the AV can start navigating, perhaps through thick traffic, towards a now better-defined and precise pickup location. Thus the VLC on the AV and the VLC from the customer's smartphone's flash becomes an interactive, real world visual search tool. Visual signal interaction between AV and intended customers(s) can be initiated at high-density meeting locations, such as transportation portals with multiple pick-up locations.

In another embodiment, if there is a driver in the vehicle (as with a ride-sharing transaction such as Uber), the driver can point a smartphone in a direction suggested to be the location of target customer(s). Conversely, the target customer(s) would be looking at the screen of their smartphone and pointing in the expected direction of the target vehicle, such as where target vehicles would be entering a transport hub, such as at an airport, coliseum, or arena parking lot. Similar to the vehicle's VLC communication, the driver's smartphone can be pulsing its flash LED in a coded fashion that would be decoded at the target occupant's smartphone. Likewise, process happens in reverse, with the driver's smartphone decoding the unique pulsed code from the occupant's smartphone. Thus, both smartphones become light transponders. Once the discovery and spotting transition takes place and the customer approaches the target AV and/or the AV approaches the customer, then other modalities, such as RF communication via Bluetooth™ or facial recognition of the customer, become operational, and can be used to authenticate the customer as the correct occupant.

The smartphone's ability to communicate wirelessly over various modalities, to capture images and to track the phone's movement by virtue of GPS and also internal accelerometers and other sensors, makes the smartphone a logical choice for authenticating and rostering occupants of vehicles. At present, many cars are outfitted with both Bluetooth™ and Wi-Fi technology. More will such technologies in the future. These can be used to tether a smartphone to a specific vehicle based on a unique Bluetooth™ or Wi-Fi MAC address. That is, the smartphone can read the unique wireless address of the vehicle, and conversely, the vehicle can read the unique wireless address of the smartphone.

One can quickly and seamlessly build an authenticated roster of occupants by using a facial recognition application on the smartphone. Various other biometrics can be used, such as fingerprints, iris prints, ear prints, voice prints, etc., but are less convenient. A user can register with a witness, such as at a dealership, or a retail location, adding a degree of security to the registration.

Registration can also be performed online; but, while this would be a non-witnessed registration, it may be acceptable based on the security demands of the system. Therefore, it is generally understood from this that an occupant's phone can be used to take a biometric reading to authenticate the occupant, and also wirelessly communicate with the vehicle using multiple protocols and profiles.

Further, in the preferred embodiment, an occupant can allow the management system to track their location along with the vehicle's location. The management system will receive similar GPS coordinates from multiple customers, which can indicate that a number of people are co-located, such as in a vehicle. These readings would indicate that they are all moving in the same direction at the same speed. Therefore, they are all probably occupants of the same vehicle. In addition, in the preferred embodiment, the smartphone's accelerometers can be tracked for more granular data to establish that occupants are sharing the same vehicle. This can include sensing a speed bump, or sharp turn in the road. For example, the accelerometers of each of several smartphones may indicate a bump (from the speed bump) timestamped within a few milliseconds of each other, which in combination with similar GPS readings, indicates that they are passengers in the same vehicle, with the indication becoming stronger the longer the readings remain similar.

Therefore, as the management system analyzes the accelerometer reports from multiple smartphones and the vehicle, the management system is able to identify a number of phones (and their corresponding owners) experiencing the same motion signature as the vehicle. This can further allow us to determine all of the occupants of the vehicle. Note that GPS and accelerometers being used for disambiguation are not required to operate in concert. Either one may be sufficient.

In another embodiment, an accelerometer of the vehicle control system in the vehicle can be reporting from the vehicle itself via cellular telematics, or via RF connection to a smartphone and then via cellular to the network. In one example, if there is only one occupant in the vehicle, the management system can monitor to ensure that the occupant's phone motion matches the vehicle's motion. In this embodiment, the system compares the occupant's phone's motion signature to the vehicle's motion signature. If there is another occupant, that occupant can also compare to the vehicle. It is not necessary, though it may be useful, for the occupants compare their motion signatures to each other. Rostering of vehicle occupants in this way is valuable for multiple reasons.

Tracking mileage for a given vehicle is important to insurance companies and fleet managers. Insurance companies typically request annual mileage driven on forms, and the insurance companies assume some customers are lying about their annual mileage. With the present invention, mileage can be tracked by a registered smartphone paired to a vehicle, in lieu of (or in addition to) tracking the vehicle's GPS or odometer readings.

Tracking drivers is important, because it can matter who is driving the vehicle, in addition to how many miles are driven. The present invention gives insurance companies or fleet managers (or parents!) insight into who is really driving the vehicle and how many miles each driver logs. For example, a general expectation is that most families would not lend out a car for long periods of time to someone outside the family who is not intended to be covered by insurance, and the present invention allows confirmation of this.

An insurance company can incentivize a customer to download and utilize an application of the present invention to the customer's family members' phones, pair those phones with the customer's vehicles, and make those phones discoverable for use in the present invention. Based on the application and pairing of their phones to their vehicles, insurance company can know how many family members are driving and how many vehicles they own.

According to the above, the present invention includes a method to facilitate finding and spotting when a vehicle is to meet a user at a meeting location. FIG. 1 shows the overall finding and spotting process 100, comprising management system process 101, sending device process 102, and receiving device process 103. Management system process 101 begins at step 110, where information about vehicles and users is available. At step 111, a determination is made regarding which vehicle is to meet a user at a meeting location. Step 111 is optional, because in some embodiments, the meeting information may be pre-determined, for example as when provided by another system (not shown).

As shown, FIG. 1 contemplates a sending device and a receiving device. The sending device may be associated with the user (e.g., a smartphone carried by the user or AR glasses worn by the user) or the sending device may be associated with the vehicle (e.g., a module of the vehicle control system, or a smartphone carried by the driver of the vehicle). The receiving device is associated accordingly with the other one of the user and vehicle, so for example, if the sending device is associated with the vehicle, the receiving device is associated with the user.

At step 112, based on the vehicle and the user, a code is selected for a sending device at the meeting, such that the code will be unique at the meeting location. At step 113, the code is provided 141 to a receiving device (i.e., the device to receive a signal based on the code). At step 115, the code is optionally provided 142 to the sending device if needed to emit a light signal based on the code. Step 115 is optional because in some embodiments (e.g., those using lamps such as those provided by ByteLight™ Services, Inc.), the code used for the light signal of the sending device can be predetermined. The management system process 101 terminates at step 150.

The sending device process 102 begins at step 120 as the sending device approaches the meeting location. The code, if not predetermined, is received 142 from the management system at step 126. At step 127, a light signal 143 is emitted from the sending device, the light signal based on the code. The sending device process 102 concludes at step 151.

The receiving device process 103 begins at step 130 as the receiving device approaches the meeting location. The code is received 141 from the management system at step 134. At step 138, the light signal 143 is detected with a camera of the receiving device and distinguished on the basis of the code.

At step 139 the location of the sending device within the view of the camera is determined, based on the distinguished light signal. At step 152, the receiving device process concludes, returning the location within the camera's view to be displayed to a user or driver, or to be provided to a guidance module or vehicle control system of a vehicle, which may be autonomous.

In some embodiments (not shown), in a parallel trio of processes for the same vehicle and user, the assignments of sending and receiving devices are reversed, whereby each device is sending a respective signal with a respective code, and each device is receiving the others' signal based on the corresponding code, allowing each of the vehicle and the user to be finding and spotting each other simultaneously.

Several descriptions of the present invention have been given to aid in its understanding. One with skill in the art will realize that numerous changes and variations are possible without departing from the spirit of the invention. Each of these changes and variations is within the scope of the present invention.

We claim:

1. A method of identification applicable when vehicles are to meet users, the method comprising the steps of:
    receiving a code by a first one selected from a first device aboard a vehicle and a second device with a user, the code determined by a management system for a meeting between the vehicle and the user at a meeting location, the first device and the second device having communication with the management system, at least one of the first device and the second device directed to the meeting location with the management server;
    detecting a light signal, by a camera of the first one selected, the camera having a view, the light signal being within the view, the light signal emitted by a different second one selected from the first device and the second device, the light signal modulated on the basis of the code;
    distinguishing the light signal, by the first one selected, on the basis of the code;
    determining a location within the view, of the second one selected, by the first one selected, based on the distinguishing;
    providing said location within the view, by the first one selected, to a recipient.

2. The method of claim 1 wherein, the code is unique at the meeting location.

3. The method of claim 1 further comprising the step of:
    indicating the code with the management system to the second one selected.

4. The method of claim 1 further comprising the step of:
    determining with the management system that the vehicle is to meet the user at the meeting location.

5. The method of claim 1 wherein the first one selected is the second device, the recipient is the user, and the providing is on a display of the second device.

6. The method of claim 1 wherein the first one selected is the first device, the recipient is a driver of the vehicle, and the providing is on a display of the first device.

7. The method of claim 1 wherein the first one selected is the first device, the recipient is a vehicle control system of the vehicle, the first device having communication with the vehicle control system.

8. The method of claim 1 wherein the first one selected is the first device, the recipient is one of a guidance module of the vehicle, the first device having communication with the guidance module.

9. A method of identification applicable when vehicles are to meet users, the method comprising the steps of:
    receiving, by a first device, a code from a management system;
    distinguishing, by the first device, a light signal having a modulation based on the code, the light signal detected with a camera of the first device, the distinguishing based on the code;
    determining a location within a view of the camera of a second device emitting the light signal, based on the distinguishing;
    providing the location within the view, by the first device;

wherein a vehicle is to meet a user at a location,
the first device is a one selected from in a vehicle and with the user, and the second device is a different one selected from in the vehicle and with the user.

10. A method of identifying vehicles and users to each other, the method comprising the steps of:
  determining with a management system a code for a first device to send a light signal having a modulation based on the code, the first device being one of a device in a vehicle and a device with a user, the vehicle and the user to meet at a meeting location, the code being unique at the meeting location;
  providing the code to a second device with the management system, the second device to distinguish the light signal with a camera of the second device based on the code, the second device being the other one of said device in the vehicle and said device with the user;
  emitting the light signal based on the code with the first device;
  distinguishing the light signal with the camera based on the code;
  determining with the second device a location of the first device in a view of the camera;
  providing the location of the first device in the view of the camera to a recipient.

11. The method of claim 10 further comprising the step of:
  determining the vehicle to meet the user at the meeting location.

12. The method of claim 10 further comprising the step of:
  providing the code to the first device with the management system.

13. The method of claim 10 wherein the second device comprises a smartphone.

14. The method of claim 10 wherein the second device comprises a vehicle control system aboard the vehicle and the recipient is the vehicle control system.

15. The method of claim 10 wherein the second device comprises a guidance system of the vehicle and the recipient is the guidance system.

16. The method of claim 10 wherein the providing comprises the steps of:
  displaying the view of the camera on a screen of the second device to the recipient;
  indicating, by the second device, the location of the first device in the view of the camera on the screen.

17. The method of claim 10 wherein the first device is said device in the vehicle and the second device is said device with the user, the user is the recipient, the method further comprising the steps of:
  displaying to the user the view of the camera on a screen of the second device;
  indicating the location of the vehicle corresponding to the first device in the view of the camera on the screen by displaying at least one attribute of the vehicle.

* * * * *